(12) United States Patent
Dumitru et al.

(10) Patent No.: US 8,546,817 B2
(45) Date of Patent: Oct. 1, 2013

(54) HIGH TEMPERATURE STRAIN SENSOR

(75) Inventors: Viorel Georgel Dumitru, Ploiesti (RO); Mihai Brezeanu, Bucharest (RO); Stefan Dan Costea, Bucharest (RO); Ion Georgescu, Bucharest (RO); Viorel Avramescu, Bucharest (RO); Bogdan Catalin Serban, Bucharest (RO)

(73) Assignee: Honeywell International Inc., Morristown, NJ (US)

( * ) Notice: Subject to any disclaimer, the term of this patent is extended or adjusted under 35 U.S.C. 154(b) by 68 days.

(21) Appl. No.: 13/307,513

(22) Filed: Nov. 30, 2011

(65) Prior Publication Data
US 2012/0161147 A1    Jun. 28, 2012

(30) Foreign Application Priority Data
Dec. 1, 2010 (EP) .................................. 10193329

(51) Int. Cl.
*H01L 29/26* (2006.01)
*G01P 15/08* (2006.01)

(52) U.S. Cl.
USPC 257/79; 257/417; 257/E29.089; 257/E29.324

(58) Field of Classification Search
USPC ............ 257/79, 417, E29.089, E29.324
See application file for complete search history.

(56) References Cited

U.S. PATENT DOCUMENTS

| | | | |
|---|---|---|---|
| 3,786,320 A * | 1/1974 | Kano et al. | 257/418 |
| 5,528,069 A * | 6/1996 | Mladenovic et al. | 257/417 |
| 5,883,591 A * | 3/1999 | McEwan | 342/22 |
| 6,034,404 A * | 3/2000 | Soares | 257/415 |
| 6,338,275 B1 * | 1/2002 | Soares | 73/805 |
| 6,647,796 B2 | 11/2003 | Beach et al. | |
| 6,928,878 B1 | 8/2005 | Eriksen et al. | |
| 7,053,425 B2 | 5/2006 | Sandvik et al. | |
| 7,082,838 B2 * | 8/2006 | Rowe et al. | 73/777 |
| 7,181,972 B2 | 2/2007 | Dasgupta et al. | |
| 7,313,965 B2 | 1/2008 | Tilak et al. | |
| 7,403,113 B2 | 7/2008 | Moon et al. | |
| 2006/0054927 A1 | 3/2006 | Wang et al. | |
| 2007/0000330 A1 | 1/2007 | Tysoe et al. | |
| 2007/0001684 A1 * | 1/2007 | Kawamura | 324/522 |

(Continued)

FOREIGN PATENT DOCUMENTS

| | | |
|---|---|---|
| JP | 4-209575 A | 7/1992 |
| JP | 2009-049026 A | 3/2009 |

OTHER PUBLICATIONS

"European Application Serial No. 10193329.9, Office Action mailed Apr. 11, 2012", 4 pgs.

(Continued)

*Primary Examiner* — Lex Malsawma
(74) *Attorney, Agent, or Firm* — Schwegman, Lundberg & Woessner, P.A.

(57) ABSTRACT

An example sensor that includes a first Schottky diode, a second Schottky diode and an integrated circuit. The sensor further includes a voltage generator that generates a first voltage across the first Schottky diode and a second voltage across the second Schottky diode. When the first Schottky diode and the second Schottky diode are subjected to different strain, the integrated circuit measures the values of the currents flowing through the first Schottky diode and the second Schottky diode to determine the strain on an element where the first Schottky diode and the second Schottky diode are attached.

12 Claims, 10 Drawing Sheets

(56) References Cited

U.S. PATENT DOCUMENTS

| 2007/0120208 | A1 | 5/2007 | Mitra | |
|---|---|---|---|---|
| 2007/0176211 | A1* | 8/2007 | Kunze et al. | 257/232 |
| 2008/0203431 | A1 | 8/2008 | Garcia et al. | |
| 2012/0200168 | A1* | 8/2012 | Verma et al. | 307/104 |

OTHER PUBLICATIONS

"European Application Serial No. 10193329,9, Response filed Sep. 21, 2011 to Office Action mailed Jun. 10, 2011", 9 pgs.

"European Application Serial No. 10193329.9, European Search Report mailed May 13, 2011", 3 pgs.

"European Application Serial No. 10193329.9, Office Action mailed Jun. 10, 2011", 6 pgs.

"European Application Serial No. 10193329.9, Response filed Aug. 14, 2012 to Office Action mailed Apr. 11, 2012", 4 pgs.

Cimalla, V., et al., "Group III nitride and SiC based MEMS and NEMS: materials properties. technology and applications", *J. Phys. D: Appl. Phys.*, 40 (20), (2007), 6386-6434.

Eickhoff, M., et al., "Electronics and sensors based on pyroelectric AlGaN/GaN heterostructures—Part B: Sensor applications", *physica status solidi C.*, vol. 0, No. 6, (2003), 1908-1918.

Gaska, R., et al., "Piezoresistive effect in metal-semiconductor-metal structures on *p*-type GaN", *Appl. Phys. Lett.*, 76(26), (Jun. 2000), 3956-3958.

Kang, B. S., et al., "Capacitance Pressure Sensor Based on GaN High-Electron-Mobility Transistor-on-Si Membrane", *Appl. Phys. Lett.*, 86(25), (2005), 253502-1-253502-3.

Liu, Y., et al., "Effect of hydrostatic pressure on the current-voltage characteristics of GaN/AlGaN/ GaN heterostructure devices", *J. of Appl. Phy.*, 99, (2006), 113706-1-113706-5.

Pearton, S. J., et al., "GaN-based diodes and transistors for chemical, gas, biological and pressure sensing", *J. Phys.: Condens. Matter*, 16, (2004), R961-R994.

Steinke, I. P., et al., "Current versus voltage characteristics of GaN/ AlGaN/ GaN double heterostructures with varying AlGaN thickness and composition under hydrostatic pressure", *Journal of Appl. Phys.*, 103, (2008), 064502-1-064502-6.

Strittmatter, R. P., et al., "Piezoelectrically enhanced capacitive strain sensors using GaN metal-insulator-semiconductor diodes", *J. of Appl. Phys.*, 94(9), (2003), 5958-5963.

Tilak, V., et al., "GaN based high temperature in strain gauges", *J. Mater. Sci.: Mater. Electron.*, 19 (2), (2008), 195-198.

Zhao, G., et al., "A Novel Pt-AlGaN/ GaN Heterostructure Schottky Diode Gas Sensor on Si", *IECE Trans. Electron.*, vol. E86-C, No. 10, (Oct. 2003), 2027-2031.

* cited by examiner

HIGH TEMPERATURE STRAIN SENSOR

PRIORITY CLAIM AND RELATED APPLICATION

This application claims the benefit of priority under 35 U.S.C. Section 119 to European Patent Application Serial No. 10193329.9, filed Dec. 1, 2010, which application is incorporated herein by reference in its entirety.

BACKGROUND

A variety of different types of sensors are used to measure strain, vibration, pressure and/or forces. Some sensor designs are integrated onto a chip along with electronics to form intelligent sensor systems. These intelligent sensor systems are used in many applications such as internal combustion engine measurements (e.g., in-cylinder pressure and/or exhaust among others), gas turbines, aircraft engines and wings, down-hole monitoring in oil, gas and geothermal energy explorations and drilling as well as carbon capture and sequestration operations.

Historically, sensors that utilized semiconductors were made from materials such as silicon and SOI. These materials typically have limited high temperature capabilities (Si<150° C., SOI<300° C.).

Some recent designs for sensor systems incorporate wide band gap semiconductors like GaN such that the sensors and associated electronics are able to operate at temperatures above 350° C. These more recent sensor systems typically utilize GaN based strain sensors that rely on GaN HEMT, MISFET or MESFET transistors.

GaN based sensors typically operate by measuring the changes in current that flows from source to drain within the transistors. The current that flows through these types of transistors from source to drain changes because of piezo-electric charges that are generated by stress (e.g., parallel with the in-plane strain) placed on the transistors.

Other types of GaN based strain sensors monitor the piezoresistive effect in metal-semiconductor metal (MSM) structures. There are other strain sensors that utilize strain sensing nitride heterostructures.

There is a need for a sensor that is easier to read than existing sensors which include capacitive strain sensors formed with Schottky or MIS diodes. Measuring the capacitance through a diode can be more difficult than measuring a current or a voltage because signal processing is typically required when measuring capacitance whereas current and voltage can be measured directly.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, electrical, and optical changes may be made without departing from the scope of the present invention. The following description of example embodiments is, therefore, not to be taken in a limited sense, and the scope of the present invention is defined by the appended claims.

Figure 1:
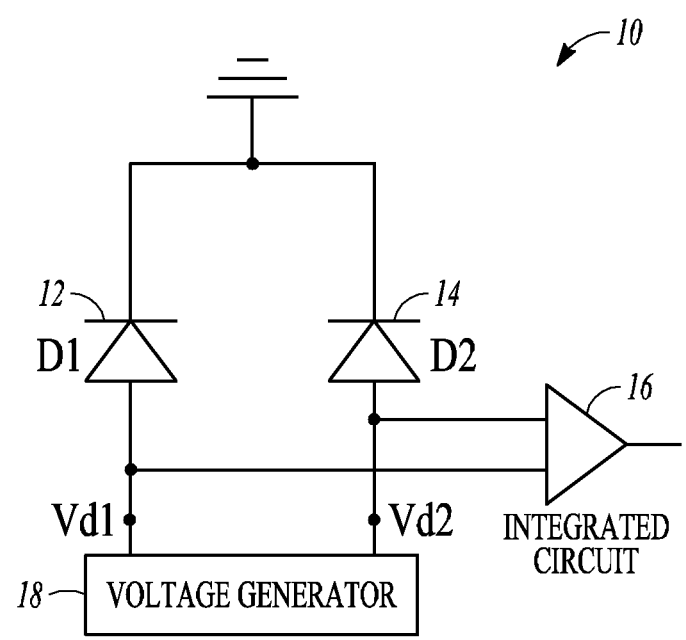
FIG. 1 illustrates an example sensor that includes two diodes.

FIG. 1 illustrates an example sensor 10 that includes a first Schottky diode 12, a second Schottky diode 14 and an integrated circuit 16. The sensor 10 further includes a voltage generator 18 that generates a first voltage Vd1 across the first Schottky diode 12 and a second voltage Vd2 across the second Schottky diode 14. When the first Schottky diode 12 and the second Schottky diode 14 are subjected to different strain, the integrated circuit 16 measures the values of the currents flowing through the first Schottky diode 12 and the second Schottky diode 14 to determine the strain on an element (not shown) where the first Schottky diode 12 and the second Schottky diode 14 are attached.

The example sensor 10 depicted in FIG. 1 consists of two identical GaN-based first and second Schottky diodes 12, 14 that are polarized independently The electrical current flowing through the first and second Schottky diodes 12, 14 is measured externally with integrated circuit 16. During operation of the example sensor 10, the first and second Schottky diodes 12, 14 are stressed in different ways (e.g., one in compression and one in tension) such that the strain can be determined by comparing the respective currents flowing through the first and second Schottky diodes 12, 14.

In some embodiments, the first and second diodes 12, 14 are identical such that using two identical diodes 12, 14 in the sensor 10 allows for a comparison of the measured currents. This comparison of two identical diodes 12, 14 compensates for any temperature changes.

In some embodiments, the integrated circuit 16 determines the pressure that the element is exposed to based on the values of the currents flowing through the first Schottky diode 12 and the second Schottky diode 14. It should be noted that the integrated circuit 16 may determine other items that the sensor 10 is exposed to such as temperature, vibration and acceleration (among others).

Figure 2:
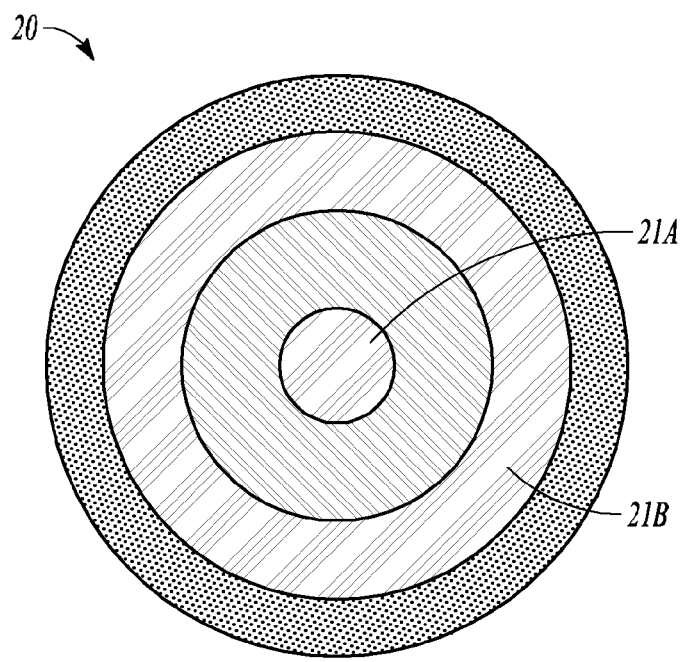
FIG. 2 illustrates a top view of an example pressure sensor that incorporates the sensor shown in FIG. 1.
Figure 3:
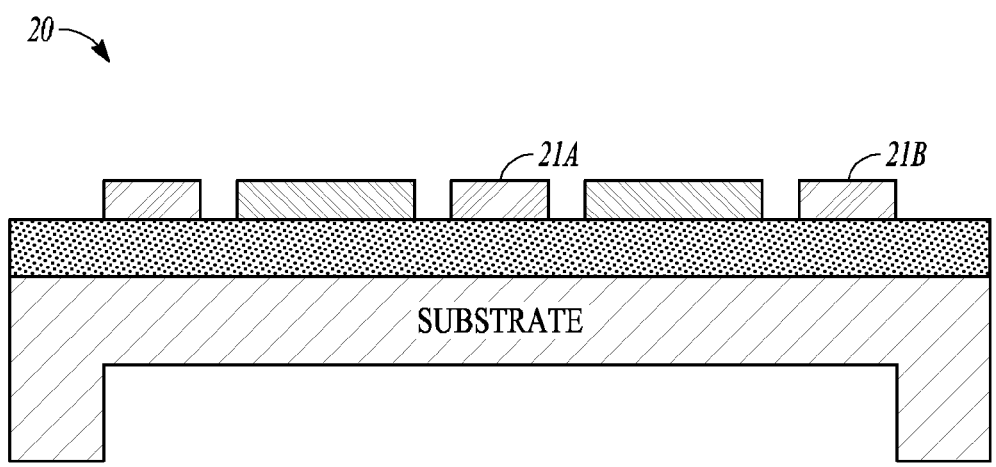
FIG. 3 illustrates a side view of the pressure sensor shown in FIG. 2.

FIGS. 2 and 3 illustrate an example pressure sensor 20 that incorporates the sensor 10 shown in FIG. 1. During operation of the sensor 20, the inner and outer Schottky contacts 21A, 21B are positioned on a diaphragm 22 such that the inner and outer Schottky contacts 21A, 21B are strained in opposite ways when the diaphragm 22 deforms.

Figure 4:
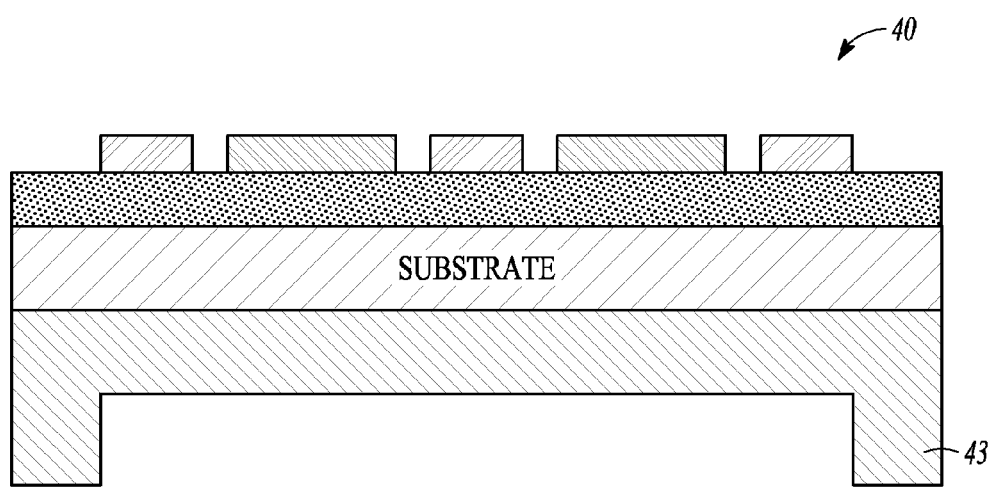
FIG. 4 illustrates a side view of another example pressure sensor that incorporates the sensor shown in FIG. 1 where the pressure sensor includes an external diaphragm.

FIG. 4 illustrates a side view of another example pressure sensor 40 that incorporates the sensor 10 shown in FIG. 1 where the pressure sensor 40 includes an external diaphragm 43. In the example embodiment that is illustrated in FIG. 4, the external diaphragm 43 is not etched in the substrate 41.

Figure 5:
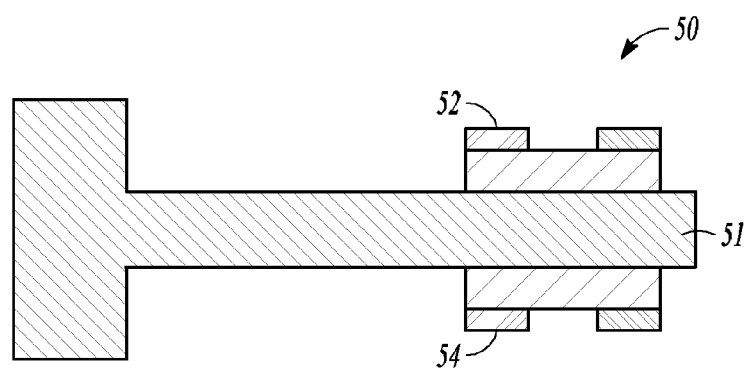
FIG. 5 a schematic view of a vibration sensor that incorporates the sensor shown in FIG. 1.

FIG. 5 a schematic view of a vibration sensor 50 that incorporates the sensor 10 shown in FIG. 1. The vibration sensor 50 includes a first diode 52 and a second diode 54 such that the first diode 52 and the second diode 54 are disposed on the opposite sides of a cantilever 51. During operation of the sensor 50, the two sides of the cantilever 51 are in-plane strained in opposite ways (one compressive and the other one tensile) when the cantilever 51 bends.

Figure 6:
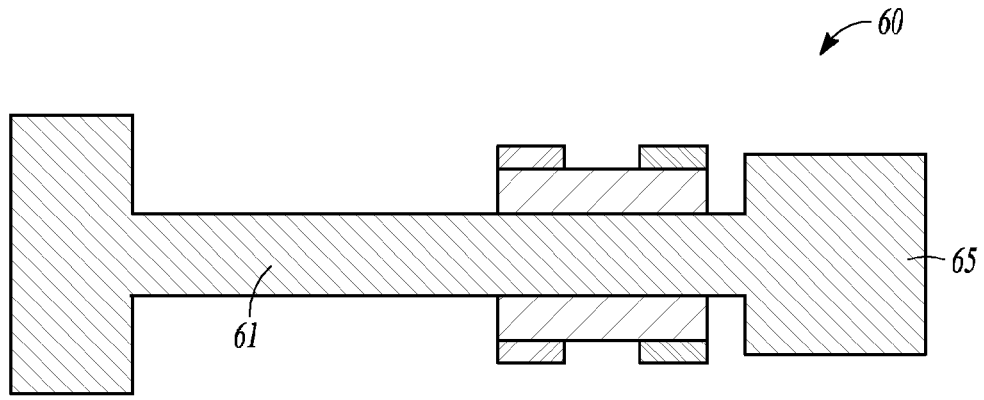
FIG. 6 a schematic view of an acceleration sensor that incorporates the sensor shown in FIG. 1.

FIG. 6 is a schematic view of an acceleration sensor 60 that incorporates the sensor 10 shown in FIG. 1. The sensor 60 shown in FIG. 6 is similar to sensor 50 shown in FIG. 5 but the cantilever 61 of sensor 60 includes an added mass 65 that may enhance sensitivity of the sensor 60.

Figure 7:
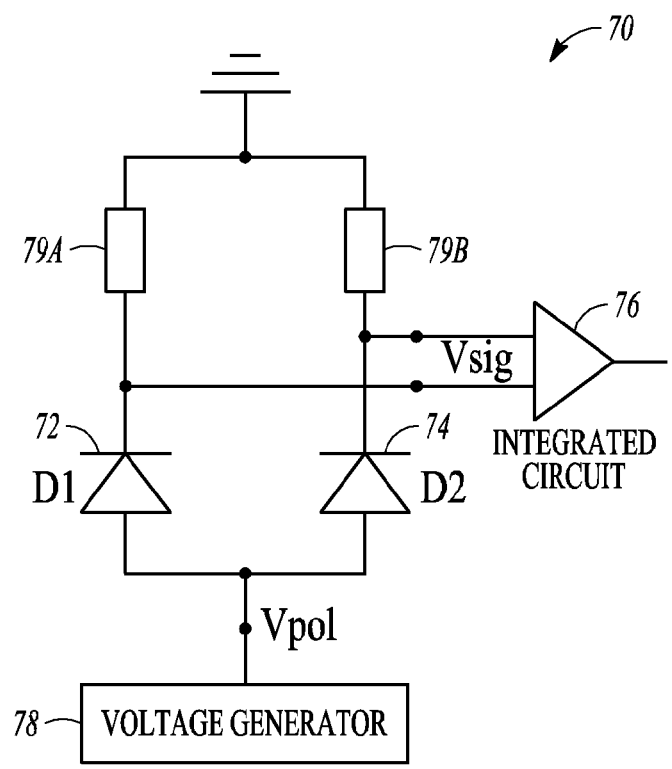
FIG. 7 illustrates another example sensor that includes two diodes and two resistors.

FIG. 7 illustrates an example sensor 70 that includes a first Schottky diode 72, a second Schottky diode 74 and an integrated circuit 76. The sensor 70 further includes a voltage generator 78 that generates a voltage Vpol across the first Schottky diode 72 and the second Schottky diode 74. When the first Schottky diode 72 and the second Schottky diode 74 are subjected to different types of strain, the integrated circuit 76 measures a difference in voltage drops between the first Schottky diode 72 and the second Schottky diode 74 in order to determine the strain on an element (not shown) where the first Schottky diode 72 and the second Schottky diode 74 are attached.

The sensor depicted in FIG. 7 may include two identical GaN based first and second Schottky diodes 72, 74 that are connected in parallel such that during operation of the sensor 70, the first and second Schottky diodes 72, 74 are subjected to different strain. In addition, each of the first and second Schottky diodes 72, 74 may be connected in series with a respective resistor 79A, 79B.

The sensor 70 shown in FIG. 7 is similar to the sensor 10 shown in FIG. 1 in that the current that flows through the first and second Schottky diodes 72, 74 is influenced by the strain induced change of the Schottky barrier height. In addition, the resistors 79A, 79B that are connected in series with the first and second Schottky diodes 72, 74 may also be sensitive to strain. This change in resistance may be readily detected directly by measuring the voltage Vsig.

In some embodiments, the first Schottky diode 72 may be subjected to a compressive strain and the second Schottky diode 74 may be subjected to a tensile strain. In other embodiments, the first Schottky diode 72 may subjected to a tensile strain and the second Schottky diode 74 may subjected to a compressive strain.

In the example embodiments that are illustrated in FIGS. 1 and 7, strain is detected in the first and second Schottky diodes due to piezoelectric generated charges that influence the Schottky barrier height. This change in Schottky barrier height changes the amount of current that flows through the Schtottky diodes. Since the amount of current that flows through the respective Schtottky diodes depends exponentially on the Schottky barrier height, the sensors 10, 70 have enhanced sensitivity towards strain, pressure, vibration and/or acceleration. In addition, by comparing signals that are generated by two identical Schtottky diodes which are subjected to different strain the sensitivity of the sensors 10, 70 may be enhanced.

In some embodiments, the integrated circuit 76 determines the pressure that the element is exposed to based on the difference in voltage drops between the first Schottky diode 72 and the second Schottky diode 74. It should be noted that the integrated circuit may determine other items that the sensor 70 is exposed to such as temperature, vibration and acceleration (among others).

Figure 8:
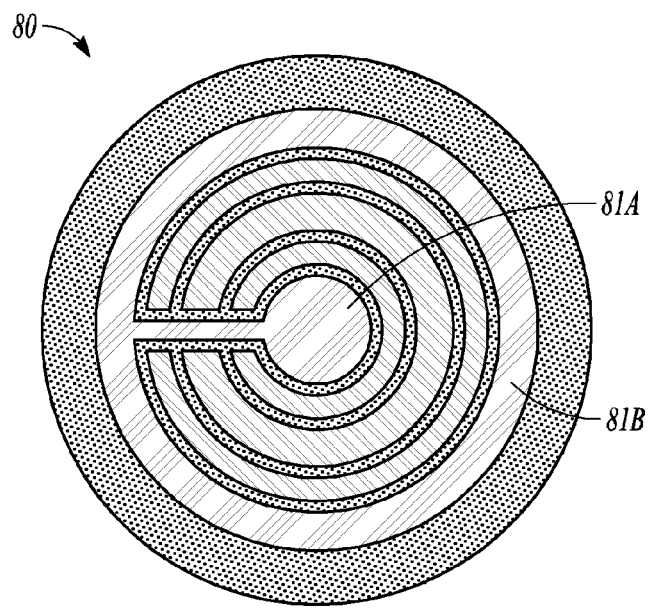
FIG. 8 a top view of an example pressure sensor that incorporates the sensor shown in FIG. 7.
Figure 9:
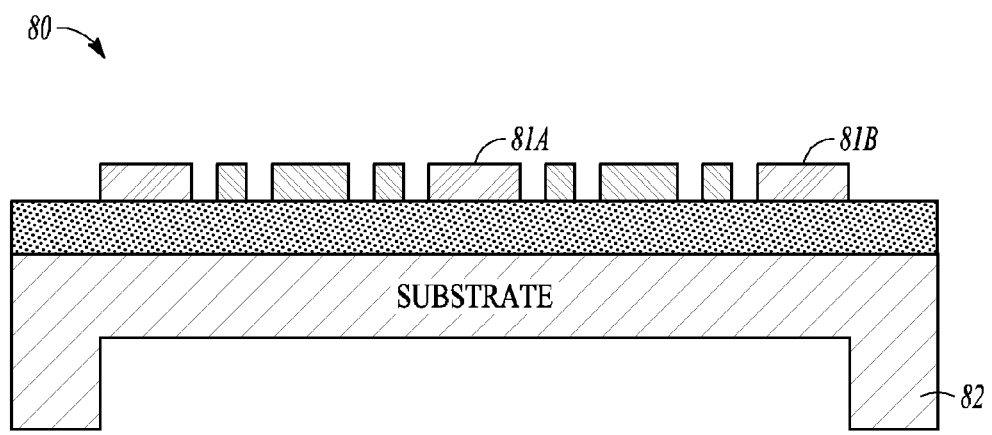
FIG. 9 illustrates a side view of the pressure sensor shown in FIG. 8.

FIGS. 8-9 illustrate an example pressure sensor 80 that incorporates the sensor 70 shown in FIG. 7. During operation of the sensor 80, the inner and outer Schottky contacts 81A, 81B are positioned on a diaphragm 82 such that the inner and outer Schottky contacts 81A, 81B are strained in opposite ways when the diaphragm 82 deforms.

Figure 10:
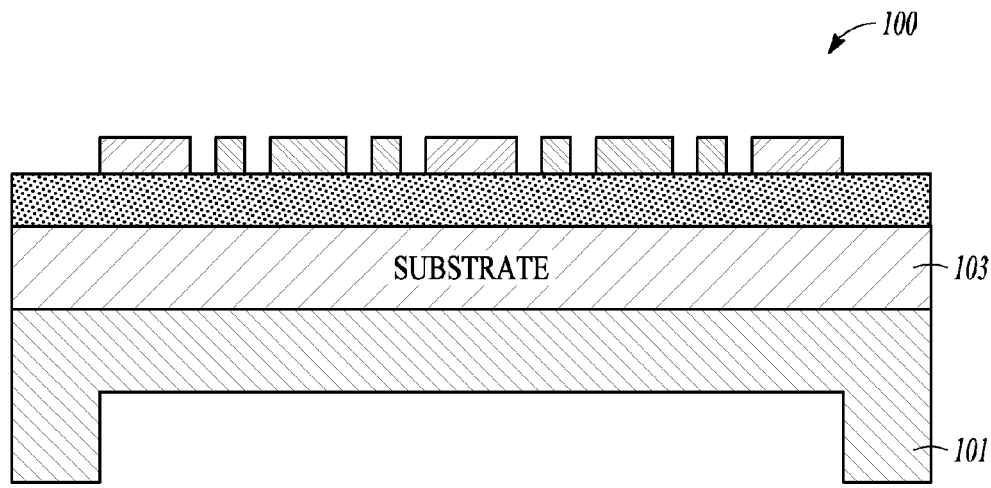
FIG. 10 illustrates a side view of another example pressure sensor that incorporates the sensor shown in FIG. 7 where the pressure sensor includes an external diaphragm.

FIG. 10 illustrates a side view of another example pressure sensor 100 that incorporates the sensor 70 shown in FIG. 7 where the pressure sensor includes an external diaphragm 101. In the example embodiment that is illustrated in FIG. 10, the external diaphragm 101 is not etched in the substrate 103.

Figure 11:
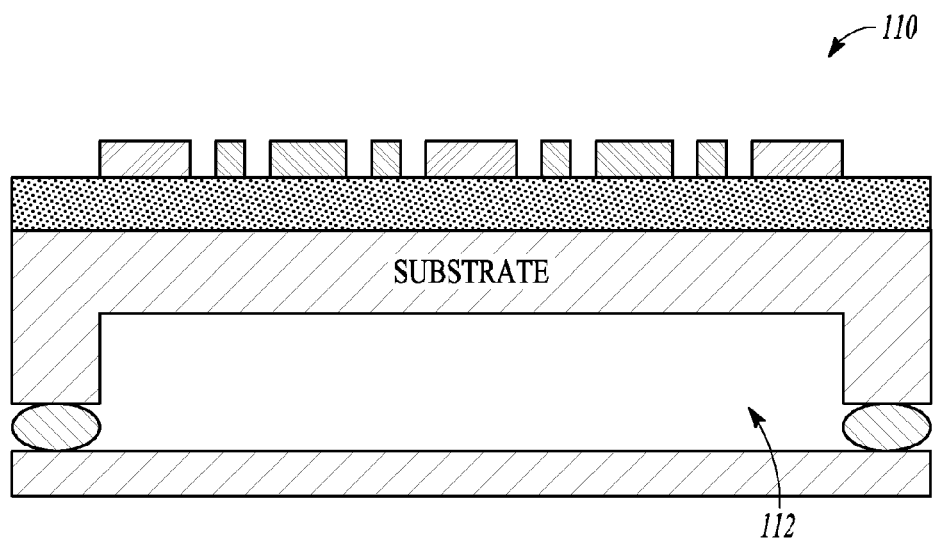
FIG. 11 illustrates a side view of another example pressure sensor that incorporates the sensor shown in FIG. 7 where the pressure sensor includes an external closed reference cavity.

FIG. 11 illustrates a side view of another example pressure sensor 110 that incorporates the sensor 70 shown in FIG. 7 where the pressure sensor 110 includes an external closed reference cavity 112.

Figure 12:
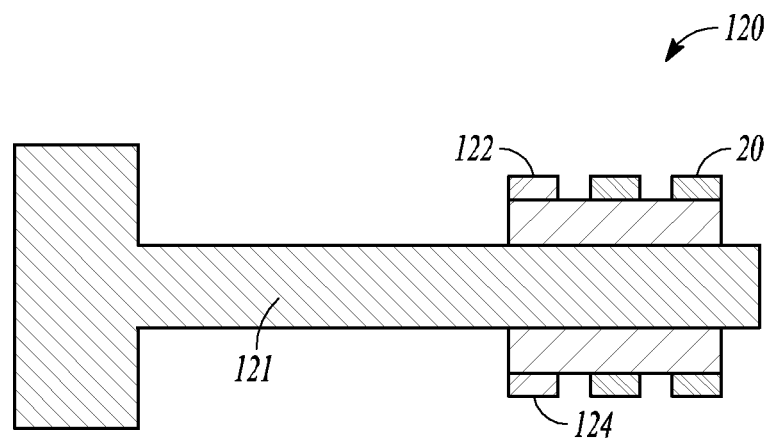
FIG. 12 a schematic view of a vibration sensor that incorporates the sensor shown in FIG. 7.

FIG. 12 a schematic view of a vibration sensor 120 that incorporates the sensor 70 shown in FIG. 7. The vibration sensor 120 includes a first diode 122 and a second diode 124 such that the first diode 122 and the second diode 124 are disposed on the opposite sides of a cantilever 121. During operation of the sensor 120, the two sides of the cantilever 121 are in-plane strained in opposite ways (one compressive and the other one tensile) when the cantilever 121 bends.

Figure 13:
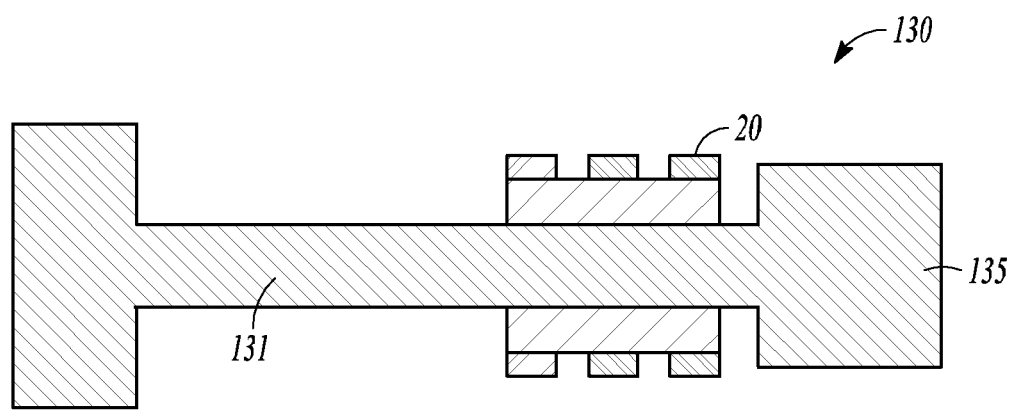
FIG. 13 a schematic view of an acceleration sensor that incorporates the sensor shown in FIG. 7.

FIG. 13 a schematic view of an acceleration sensor 130 that incorporates the sensor 70 shown in FIG. 7. The sensor 130 shown in FIG. 13 is similar to sensor 120 shown in FIG. 12 but the cantilever 131 of sensor 130 includes an added mass 135 that may enhance sensitivity of the sensor 130.

In the example embodiments that are illustrated in FIGS. 1 and 7, the first Schottky diode may be a III-nitride Schottky diode and the second Schottky diode may be a III-nitride Schottky diode. It should be noted that any type of III-nitrides based Schottky diodes may be utilized. As an example, Schottky diodes may be used that include more than omogen III-nitride material layer (i.e., Schottky diodes that have more than one layer in the vertical structure).

Figure 14:
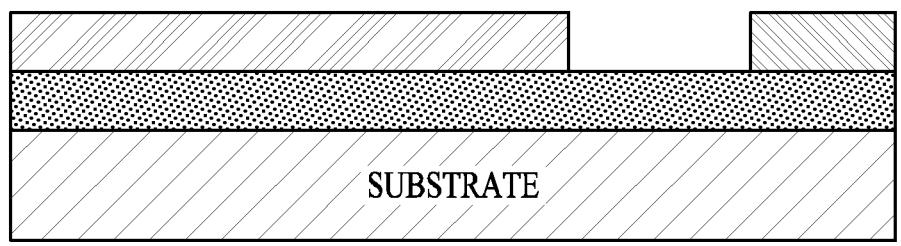
FIG. 14 illustrates an example nitride based Schottky diode that may be used in the sensors shown in FIGS. 1 and 7.
Figure 15:
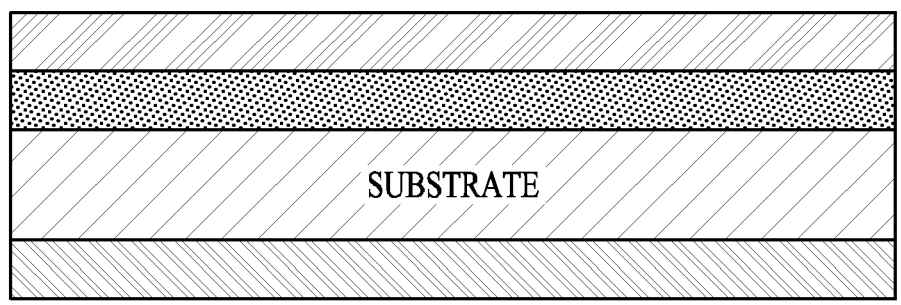
FIG. 15 illustrates another example nitride based Schottky diode that may be used in the sensors shown in FIGS. 1 and 7.

FIG. 14 illustrates an example nitride based Schottky diode 140 that may be used in the sensors 10, 70 shown in FIGS. 1 and 7. FIG. 15 illustrates another example nitride based Schottky diode 150 that may be used in the sensors 10, 70 shown in FIGS. 1 and 7.

In other embodiments the sensors 10, 70 may include III-nitrides based heterostructures having two ohmic contacts instead of Schottky diodes (i.e., devices with one ohmic and one Schottky contact). When III-nitrides based heterostructures are utilized, the strain sensitive barrier is located at the hetero-interface. During operation of the sensors, the current flowing through heterostructure is influenced by the effective potential barrier change at the hetero-interface due to strain generated piezoelectric charges.

Figure 16:
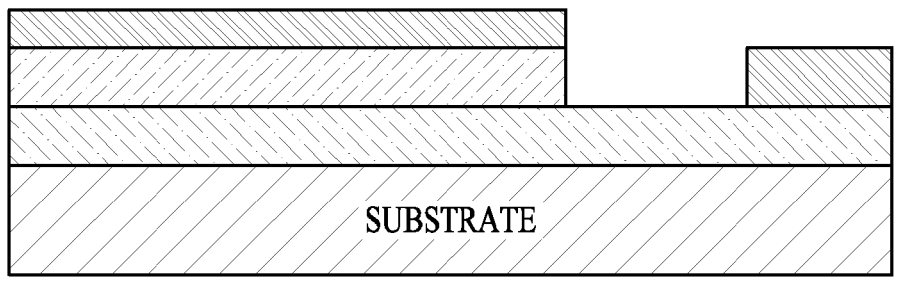
FIG. 16 illustrates an example nitride based heterostructure diode that may be used in the sensors shown in FIGS. 1 and 7.
Figure 17:
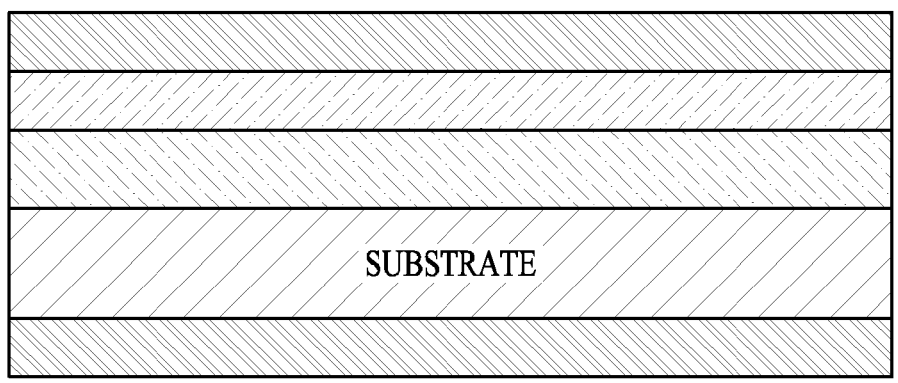
FIG. 17 illustrates another example nitride based heterostructure diode that may be used in the sensors shown in FIGS. 1 and 7.

Some examples of such III-nitrides heterostructures are depicted in FIGS. 16 and 17. The illustrated "nitride 1" and "nitride 2" could be material pairs such as GaN/AlGaN, InGaN/GaN, InGaN/AlGaN, InAlN/AlGaN, or generally AlInGaN/AlInGaN pairs where the two "nitrides" layers have different bandgaps due to different alloy compositions.

FIG. 16 illustrates an example nitride based heterostructure diode 160 that may be used in the sensors 10, 70 shown in FIGS. 1 and 7. FIG. 17 illustrates another example nitride based heterostructure diode 170 that may be used in the sensors 10, 70 shown in FIGS. 1 and 7.

Figure 18:
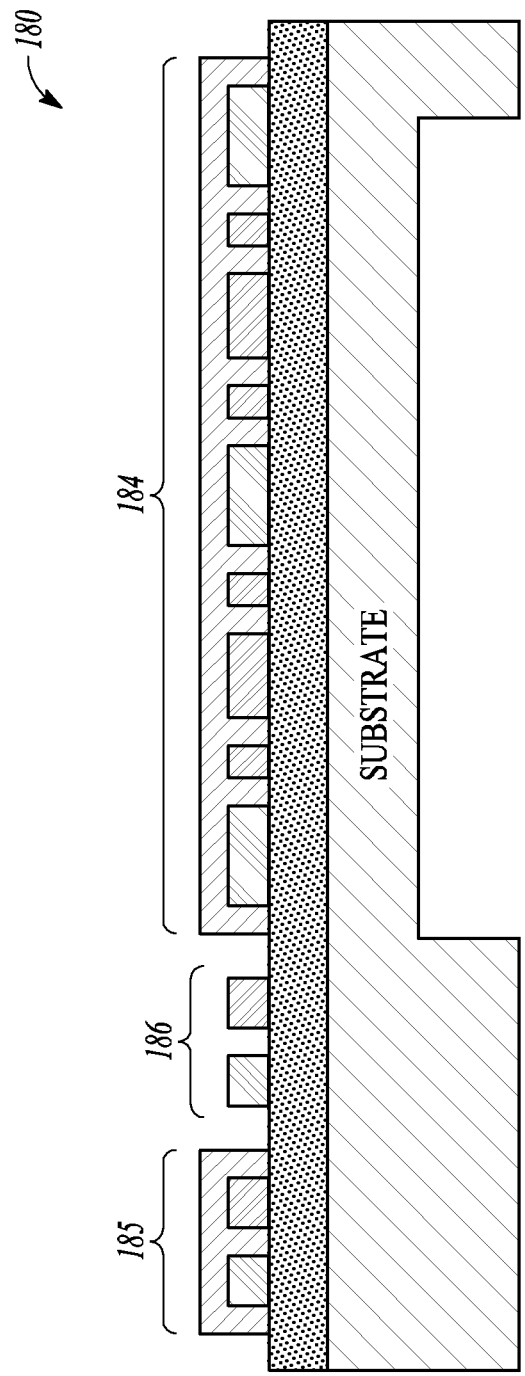
FIG. 18 is a side view of an on-chip integrated high temperature sensor that includes a pressure sensor, temperature sensor and a gas sensor.

FIG. 18 is a schematic section view of an on-chip integrated high temperature sensor 180 that includes a pressure sensor 184, temperature sensor 185 and a gas sensor 186. In some embodiments, the pressure, temperature and/or gas sensing structures 184, 185, 186 may be formed of III-nitrides based Schottky diodes or heterostructures.

The sensors described herein utilize III-nitrides (GaN and its alloys) Schottky diodes and to provide high temperature strain/pressure, vibration and acceleration sensing. The sensors may be suitable for use at relatively high temperatures (e.g., >350 C.). The sensors may also provide easy reading and may simplify signal processing.

The sensors may have improved sensitivity because sensing is based on the piezoelectric effect at the Schottky contact (or at the hetero-interface in case of heterostructures). In addition, the sensors may utilize in some embodiments the piezoresisitve effect in GaN layers.

The invention claimed is:

1. A sensor comprising: a first Schottky diode; a second Schottky diode; an integrated circuit; and a voltage generator that generates a first voltage across the first Schottky diode and a second voltage across the second Schottky diode such that when the first Schottky diode and the second Schottky diode are subjected to different strain the integrated circuit measures the values of the currents flowing through the first Schottky diode and the second Schottky diode to determine the strain on an element where the first Schottky diode and the second Schottky diode are attached, wherein the first Schottky diode is subjected to a compressive strain and the second Schottky diode is subjected to a tensile strain.

2. The sensor of claim 1 wherein the first Schottky diode is a III-nitride Schottky diode and the second Schottky diode is a III-nitride Schottky diode.

3. The sensor of claim 1 wherein the integrated circuit determines the pressure that the element is exposed to based on the values of the currents flowing through the first Schottky diode and the second Schottky diode.

4. A sensor comprising: a first Schottky diode; a second Schottky diode connected in parallel with the first Schottky diode; a first resistor connected in series with the first Schottky diode; a second resistor connected in series with the second Schottky diode; an integrated circuit; and a voltage generator that generates a voltage across the first Schottky diode and the second Schottky diode such that when the first Schottky diode and the second Schottky diode are subjected to different strain the integrated circuit measures a difference in voltage drops between the first Schottky diode and the second Schottky diode in order to determine the strain on an element where the first Schottky diode and the second Schottky diode are attached, wherein the first Schottky diode is subjected to a compressive strain and the second Schottky diode is subjected to a tensile strain.

5. The sensor of claim 4 wherein the first Schottky diode is a III-nitride Schottky diode and the second Schottky diode is a III-nitride Schottky diode.

6. The sensor of claim 4 wherein the integrated circuit determines the pressure that the element is exposed to based on the difference in voltage drops between the first Schottky diode and the second Schottky diode.

7. A sensor comprising: a first Nitride hetero structure; a second Nitride heterostructure; an integrated circuit; and a voltage generator that generate a first voltage across the first Nitride heterostructure and a second voltage across the second Nitride hetero structure such that when the first Nitride hetero structure and the second Nitride hetero structure are subjected to different strain the integrated circuit uses the values of the currents flowing through the first Nitride heterostructure and the second Nitride hetero structure measures in order to determine the strain on an element where the first Nitride hetero structure and the second Nitride hetero structure are attached, wherein the first Nitride heterostructure is subjected to a compressive strain and the second Nitride hetero structure is subjected to a tensile strain.

8. The sensor of claim 7 wherein the integrated circuit determines the pressure that the element is exposed to based on the values of the currents flowing through the first Nitride heterostructure and the second Nitride heterostructure.

9. The sensor of claim 7 wherein the first Nitride hetero structure is a gallium nitride and aluminum gallium nitride hetero structure and the second Nitride heterostructure is a gallium nitride and aluminum gallium nitride heterostructure.

10. A sensor comprising: a first Nitride hetero structure; a second Nitride heterostructure connected in parallel with the first Nitride heterostructure; a first resistor connected in series with the first Nitride heterostructure; a second resistor connected in series with the second Nitride heterostructure; an integrated circuit; and a voltage generator that generates a voltage across the first Nitride heterostructure and the second Nitride hetero structure such that when the first Nitride hetero structure and the second Nitride hetero structure are subjected to different strain the integrated circuit measures a difference in voltage drops between the first Nitride heterostructure and the second Nitride hetero structure in order to determine the strain on an element where the first Nitride hetero structure and the second Nitride hetero structure are attached, wherein the first Nitride heterostructure is subjected to a compressive strain and the second Nitride hetero structure is subjected to a tensile strain.

11. The sensor of claim 10 wherein the integrated circuit determines the pressure that the element is exposed to based on the difference in voltage drops between the first Nitride heterostructure and the second Nitride heterostructure.

12. The sensor of claim 10 wherein the first Nitride hetero structure is a gallium nitride and aluminum gallium nitride hetero structure and the second Nitride heterostructure is a gallium nitride and aluminum gallium nitride heterostructure.

* * * * *